Sept. 8, 1959 G. H. GLOSS ET AL 2,903,336
PRODUCTION OF POTASSIUM CARBONATE
Filed July 5, 1955
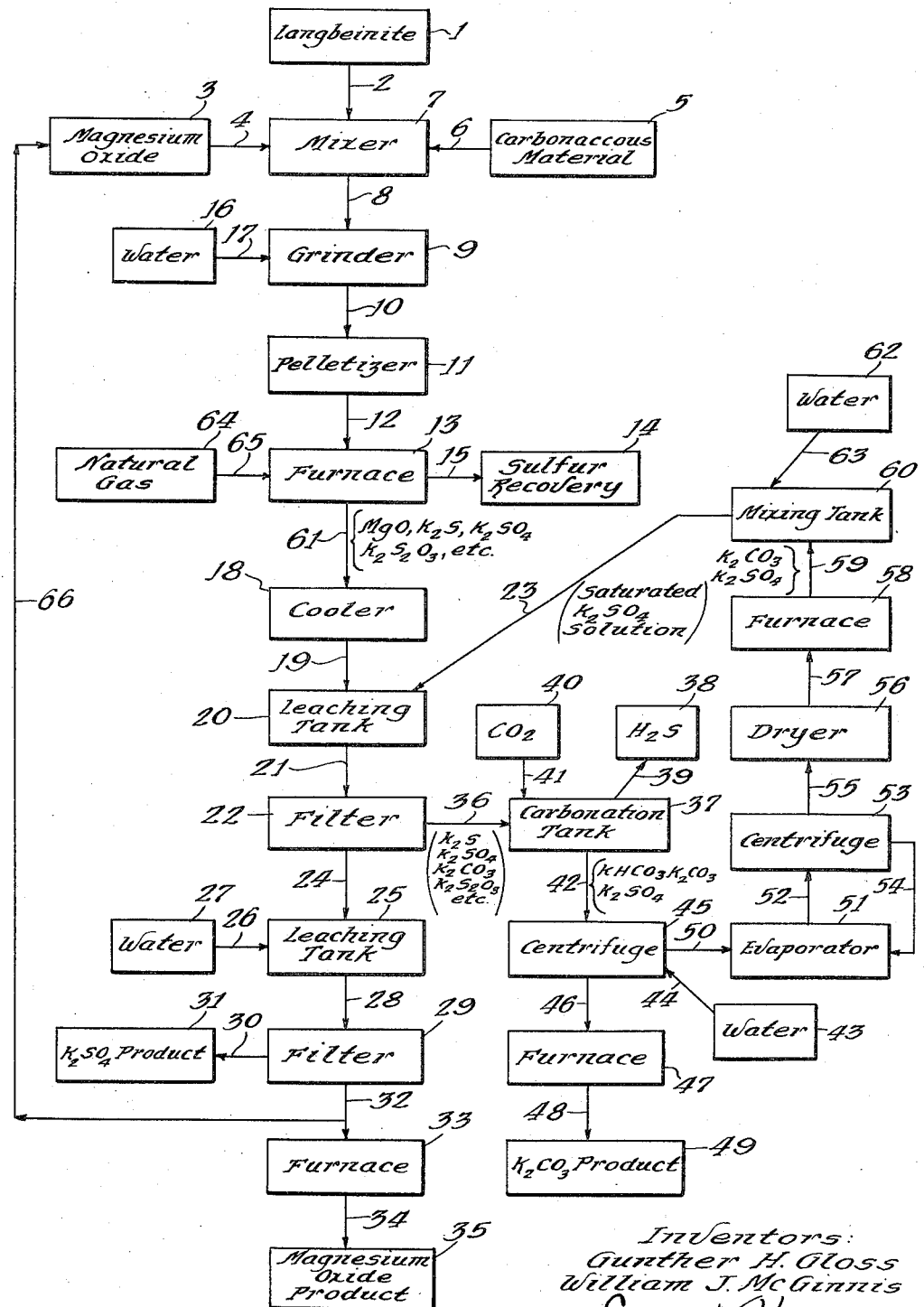

United States Patent Office 2,903,336
Patented Sept. 8, 1959

2,903,336

PRODUCTION OF POTASSIUM CARBONATE

Gunter H. Gloss, Lake Bluff, and William J. McGinnis, Chicago, Ill., assignors to International Minerals & Chemical Corporation, a corporation of New York Application July 5, 1955, Serial No. 519,805

7 Claims. (Cl. 23—33)

This invention relates to the recovery of potassium values from langbeinite ore and, more particularly, to the recovery of potassium values from langbeinite ore in the form of potassium sulfate and potassium carbonate.

Langbeinite is a double salt of potassium sulfate and magnesium sulfate containing two molecules of the latter for each molecule of the former. Customarily, the potash values in langbeinite ore have been recovered by reacting langbeinite with an aqueous solution of potassium chloride to produce potassium sulfate. The potassium sulfate was crystallized from the solution and recovered, for example, by filtration. The potassium sulfate mother liquor may then be processed by one or anohter procedure to recover the magnesium chloride. This process for recovering potash values from langbeinite requires a high purity potassium chloride and has the further disadvantage that a fourth component, namely, chloride ions is added to the system. A process capable of recovering the potash values from langbeinite, without the use of any potassium chloride whatsoever would have obvious economic advantages, particularly, if the magnesium values could be recovered simultaneously in the form of magnesium oxide.

It is an object of this invention to recover the potash values from a double sulfate salt of potassium and magnesium without using potassium chloride.

It is another object of this invention to recover the potash values from langbeinite in the form of potassium sulfate and potassium carbonate.

It is a further object of this invention to recover the potash values from langbeinite ore as potassium sulfate and potassium carbonate which are virtually free of chloride contamination.

Another object of this invention is to provide a simple commercially feasible process for recovering the potash values from langbeinite ore and to produce as a co-product magnesium oxide which is suitable for refractory or chemical applications.

Still another object of this invention is to recover the potash values from langbeinite in the form of potassium sulfate and potassium carbonate by a process utilizing a minimum amount of fresh water.

In accordance with this invention, potassium and magnesium values are recovered from a mixture containing essentially magnesium oxide, potassium sulfate and potassium sulfide by agitating the mixture with a saturated aqueous solution of potassium sulfate until substantially all of the potassium sulfide is dissolved, separating the resulting solution from the residual solids, carbonating the solution and recovering potassium values from the separated solution as potassium carbonate or bicarbonate.

In accordance with one embodiment of this invention, a double sulfate salt of potassium and magnesium, preferably langbeinite, is mixed with a carbonaceous material, such as petroleum coke and also with magnesium oxide or potassium carbonate, preferably magnesium oxide recovered in a subsequent step in the process. If the magnesium oxide or potassium carbonate contains sodium chloride or other materials which are not volatilized during the subsequent furnacing operation, these impurities will contaminate the potassium carbonate product. Magnesium oxide recycled from a subsequent step in the process will contain substantially no sodium chloride and is, therefore, a preferred source of magnesium oxide when it is desired that the products of the process be chloride-free. The double salt utilized may contain up to about 2% sodium chloride, by weight, but desirably will contain substantially less than this amount in order to avoid the tendency of the reaction mixture to fuse during the furnacing operation. Preferably, the langbeinite will contain less than about 1% sodium chloride by weight. Fusing of the reaction mixture during the furnacing operation is undesirable as reducing the efficiency of the operation. Extensive fusion of the charge renders the process inoperable. If there is sodium chloride present in the magnesium oxide employed, the sodium chloride content of the langbeinite must be sufficiently low so that the langbeinite-magnesium oxide-carbonaceous material mixture does not contain more than 2% sodium chloride, by weight, if fusion is to be avoided. Preferably, the quantity of magnesium oxide or potassium carbonate present in the reaction admixture will amount to between about 5% and about 20%, based on the weight of langbeinite. Less than about 5% may be utilized, but the advantage of employing these materials is most significant at concentrations above about 5%. Fusion or softening of the reaction mass is not dependent solely on the sodium chloride concentration of the mixture, but may occur solely as a result of formation of sulfur compounds which form a eutectic melting in the range of temperatures employed in the furnacing operation. The presence of between about 5% and about 20% magnesium oxide and/or potassium carbonate in the reaction mixture eliminates the danger of fusion of the reaction mass due to formation of a eutectic and provides a commercially feasible process even when relatively impure starting materials having relatively high sodium chloride contents are employed.

Utilizing a langbeinite feed very low in sodium chloride content, for example, containing of the order of about 0.5% or less, it is possible to avoid fusion of the furnace charge in the absence of magnesium oxide if temperatures less than about 830° C. are employed in the reduction process is carried to a low conversion of potassium sulfate to potassium sulfide, that is, to about 60% or less of the theoretical. Utilizing a langbeinite feed high in sodium chloride content, that is, containing between about 1% and about 2% by weight of sodium chloride, magnesium oxide or potassium carbonate should be added to the mixture of langbeinite and carbonaceous material to avoid fusion or melting of this mixture during furnacing. With a leonite or schoenite feed, magnesium oxide or potassium carbonate should be added in any case.

The mixture of langbenite, carbonaceous material and magnesium oxide is ground to a size smaller than about 50 mesh, and preferably, to a size less than about 80 mesh. The comminuted mixture is then formed into pellets in any convenient pelletizing or extrusion press. Sufficient water is added to the mixture prior to pelletizing to aid in the pellet-forming step. Usually about 10% water based on the weight of the solids mixture will be sufficient. Desirably, the amount of water should be as great as possible without causing plugging of the dies of the press. Preferably, the pellets are formed at a pressure of between about 5,000 p.s.i. and about 12,000 p.s.i. Greater pressures can be utilized if desired, but usually there is no advantage in doing so. In certain instances, depending upon the character of the materials in the mixture, less pressure may be utilized. It is only necessary to use that pressure which will produce pellets capable of being treated in a furnace at a temperature of between about 725° C. and about 1000° C. without substantial disintegration. The size of the pellets may range from between about ¼ inch in diameter to over 1 inch in diameter. Any convenient size in this range is acceptable, and if desired, large pellets may be formed and then crushed to a smaller size before furnacing. In this case, however, care must be taken to avoid the presence in the charge of a large proportion of the fine material, that is, material of less than ¼ inch diameter.

The pellet forming step is important in carrying out the process of this invention. Without pelleting, there is a distinct tendency of the mass to fuse during furnacing and this tendency is independent of the sodium chloride concentration of the langbeinite. The tendency of the mass to fuse is increased by the presence of fine materials in the mixture. Mixing and then pelleting has the further advantage in that it brings the carbonaceous material and langbeinite into very intimate contact, thereby facilitating the reduction of the sulfate compounds during the furnacing, that is, permitting more complete reduction of the potassium sulfate in a shorter period of time than would otherwise be possible.

The pelleted mixture is heated at a temperature between about 725° C. and about 1000° C. in any conventional reducing furnace. Preferably, however, the reaction is carried out in a direct-fired furnace operated with a reducing flame. A direct-fired rotary furnace or kiln, or a direct-fired multiple hearth furnace is preferred. Generally, the furnace is operated at the lowest possible temperature which will produce substantial reduction of the potassium sulfate component of the langbeinite, and preferably at a temperature between about 775° C. and about 900° C. At high temperatures, for example, at temperatures greater than about 1000° C., there is a substantial danger of fusion of the charge regardless of sodium chloride content and fine material present and such temperatures are avoided. At temperatures below about 725° C. no substantial reduction of the potassium sulfate component of the langbeinite takes place. When the reduction process is carried out in a direct-fired furnace, it is necessary to use a reducing flame and preferably a reducing flame with the quantity of air amounting to between about 50% and about 70%, preferably about 60% of that theoretically required for complete combustion of the combustible gases. A reducing flame increases the rate of the reduction reaction and the degree of reduction of the langbeinite.

The reaction product mixture is cooled and treated with a saturated aqueous solution of potassium sulfate whereby the potassium sulfide component of the reduced mixture is dissolved leaving the magnesium oxide and potassium sulfate components of the reduced mixture undissolved. The leaching results in the dissolution of substantially all of the potassium sulfide, leaving magnesium oxide and potassium sulfate as the residue. Preferably the leaching solution will be a saturated potassium sulfate solution containing dissolved potassium carbonate. Potassium sulfate is less soluble in a potassium carbonate solution than in fresh water and use of a leaching solution comprising a saturated potassium sulfate solution containing dissolved potassium carbonate results in less potassium sulfate being carried forward in the process than would be the case if a saturated potassium sulfate solution containing no potassium carbonate were utilized. Preferably the leaching solution will contain between about 10% and about 20% potassium carbonate by weight.

Most of the potassium sulfate is removed from the process along with the magnesium oxide. The insoluble residue comprising magnesium oxide and potassium sulfate is separated from the leaching solution by any convenient means, for example, by filtration. Potassium sulfate present in the insoluble residue can be separated from the magnesium oxide by leaching with water leaving magnesium oxide substantially entirely free of chloride contamination, it being suitable for mixing with langbeinite and carbonaceous material in the inital step in the process. Alternatively, the magnesium oxide may be dried and purified by calcination. Magnesium oxide thus produced is suitable for refractory or chemical applications. The potassium sulfate solution produced by leaching the solids mixture containing magnesium oxide and potassium sulfate with water may be processed to crystallize and recover the potassium sulfate therefrom in accordance with conventional procedures.

The leaching solution remaining following the removal of insoluble magnesium oxide and potassium sulfate and containing essentially potassium sulfate, potassium sulfide and potassium carbonate and also some intermediate sulfur compounds, for example, potassium thiosulfate and potassium sulfite is carbonated by passing carbon dioxide gas, for example flue gas, through the solution until substantially all sulfide ions are removed from the solution, preferably until the pH of the solution is adjusted to between about 7.9 and about 8.5. The carbonation reaction converts any potassium sulfide present to potassium bicarbonate and potassium carbonate. If the carbonation is allowed to proceed until the pH of the solution is adjusted to a value less than about pH 7.9 elemental sulfur will be precipitated and contaminate the precipitated potassium bicarbonate. On the other hand, it is desirable that the carbonation reaction be allowed to proceed until the pH approaches 7.9 in order that substantially all of the potassium sulfide present may be converted to potassium bicarbonate. The solid potassium bicarbonate may be separated from the solution by any convenient means, for example, by filtration or by centrifuging after which it may be utilized as such or calcined to produce potassium carbonate.

Following the removal of solid phase potassium bicarbonate, the solution remaining contains potassium sulfate, potassium bicarbonate, and intermediate sulfur compounds, such as potassium thiosulfate and potassium sulfite, and is then concentrated to recover solids. Such a solution may be evaporated to dryness to recover all the solids at once, but preferably it is partially concentrated to crystallize solids from the solution and the solids are then removed from the remaining solution by any convenient means such as filtration or centrifugation. Any remaining liquid is then recycled to the evaporator. The recovered solids which contain potassium carbonate, potassium sulfate and intermediate sulfur compounds are dried and then calcined to convert the intermediate sulfur compounds to potassium sulfate. As ultimate calcined solids, potassium carbonate and potassium sulfate are produced. These solids are admixed with water in an amount sufficient to dissolve all of the potassium carbonate but insufficient to dissolve all of the potassium sulfate. The resulting slurry is used for leaching potassium sulfide from the mixture of magnesium oxide, potassium sulfide and potassium sulfate in the first leaching step in the process. Usually the slurry is used in an amount at least as great as the weight of the mixture of magnesium oxide, potassium sulfide and potassium sulfate and preferably in an amount about equal to the weight of the mixture but in any case sufficient slurry (comprising a saturated potassium sulfate solution and some solid phase potassium sulfate) is used to permit dissolution of all the potassium sulfide in the mixture. By utilizing such a slurry in place of fresh water the total quantity of fresh water utilized in the overall process amounts to only about one-third of the amount which would otherwise be required. In view of the fact that double sulfate salts of potassium and magnesium are presently available in commercial quantities mostly in arid regions where water is not only expensive but is sometimes unobtainable, the process of this invention is particularly valuable for commercial operations in these locations, whereas a process requiring large amounts of fresh water would be completely unfeasible.

The process of this invention will be better understood from a consideration of the flow sheet shown on the drawing. In the drawing, langbeinite 1 is charged into mixer 7 by line 2 and carbonaceous material 5 and magnesium oxide 3 are charged into mixer 7 by lines 6 and 4 respectively. The mixture is then fed into grinder 9 by line 8 where it is comminuted to a size of less than about 50 mesh and preferably less than about 80 mesh. The comminuted mixture is then moistened with water 16 which is added by line 17 and transferred to pelletizer 11 by line 10. Water is added in sufficient amount to permit the comminuted mixture to be formed into relatively hard, rugged pellets, but the amount of water is less than that which will result in a plugging of the dies of the pelletizing machine. The pellets are transferred to furnace 13 by line 12 where they are heated until the potassium sulfate component of the langbeinite is substantially completely reduced to potassium sulfide. Preferably, the furnace will be a direct-fired furnace operated with a reducing flame, although an indirect-fired furnace charged with a reducing atmosphere may be utilized if greater expense and lower thermal efficiency can be tolerated. Exit gases from the furnace comprising volatilized sulfur, hydrogen sulfide, water vapor, oxides of carbon, etc., are conveyed to a sulfur recovery station 14 by line 15. The sulfur component of the gases may be recovered by conventional means, for example, by the well known Claus process.

Solids produced are recovered from furnace 13 and conveyed to cooler 18 by line 61 where the solids are cooled in a relatively dry non-oxidizing atmosphere to a temperature below about 100° C. and preferably to about 80° C. before being conveyed to leaching tank 20 by line 19. Moisture present during the cooling increases greatly the tendency of the furnace product to re-oxidize. In accordance with a preferred embodiment of this invention, the cooling of the solids product is effected in a reducing atmosphere preferably by adding dry natural gas to the cooler 18. The natural gas thereby adsorbs heat from the solids product from the furnace and the heated natural gas is then conducted to furnace 13 where it is utilized as a fuel. By using the pre-heated gas as fuel for firing the furnace substantially less than the quantity of air (about 60% of the theoretical required for complete combustion) ordinarily used in burning the natural gas in the furnace can be used and with the advantage that the combustion gases produced are substantially richer in hydrogen and carbon monoxide and poorer in carbon dioxide and water vapor than when the gas is not pre-heated. Thus pre-heating the natural gas improves substantially the reducing characteristics of the reducing atmosphere in the furnace and thereby the efficiency of the furnace. Passing natural gas over the solids product from furnace 13 to effect the cooling thereof also serves another purpose. The solids product being in the reduced state is susceptible to oxidation and cooling it in the presence of air, oxygen, carbon dioxide or water results in oxidation of some of the potassium sulfide component present to potassium sulfate, thereby reducing the yield of potassium carbonate in the overall process. Cooling the solids product in the presence of natural gas, however, prevents any oxidation of the potassium sulfide and, therefore, maintains the yield of potassium carbonate at the maximum value attainable based on the reduction obtained in furnace 13.

After cooling the solids product from furnace 13 in cooler 18, the cooled solids are transferred to leaching tank 20 by line 19 where they are mixed with an aqueous solution of potassium sulfate preferably a saturated solution entering by line 23. Sufficient potassium sulfate solution is added to dissolve substantially all of the potassium sulfide present in the solids. Intermediate sulfur compounds, such as potassium sulfite and potassium thiosulfate which are present in the solids will also be dissolved in the saturated potassium sulfate solution.

Leaching of potassium sulfide from the solids is preferably carried out at between about 25° C. and about 40° C. Above 40° C. there is a tendency for increased quantities of intermediate sulfur compounds to form thereby reducing potassium carbonate yields. After dissolution of soluble components in the reduced solid mixture is complete, the resulting slurry is transferred to filter 22 by line 21 where residual solids are separated from the solution. The residual solids, comprising magnesium oxide and potassium sulfate, are removed from filter 22 by line 24 and transferred to leaching tank 25 where the potassium sulfate is leached from the residual solids by adding sufficient water 27 through line 26 to the leaching tank containing the solids to accomplish this result. The resulting slurry is transferred to filter 29 by line 28. The potassium sulfate solution is removed from the filter by line 30 and sent to potassium sulfate recovery 31. The filter cake comprising magnesium oxide is removed by line 32 and calcined in furnace 33. Part of the magnesium oxide cake is recycled to mixer 7 to be admixed with additional langbeinite and carbonaceous material. The remainder of the magnesium oxide cake is calcined in furnace 33 after which the magnesium oxide product 35 is removed by line 34.

Filtrate from filter 22 is removed by line 36 and comprises a solution of potassium sulfide, potassium thiosulfate, potassium sulfite, potassium carbonate and other intermediate sulfur compounds. The solution is fed into carbonation tank 37 where carbon dioxide 40 is added by line 41 until the pH of the solution is adjusted to between about 7.9 and about 8.5. During the carbonation reaction, potassium sulfide is converted to potassium carbonate and potassium bicarbonate with the hydrogen sulfide produced being removed by line 39. The carbonation results in the formation and precipitation of solid potassium bicarbonate. The resulting slurry is transferred to centrifuge 45 by line 42 where the solid potassium bicarbonate is separated, washed with water 43 entering the centrifuge by line 44 and the separated liquor containing dissolved potassium sulfate, potassium bicarbonate, potassium thiosulfate, potassium sulfite and other intermediate sulfur compounds transferred to evaporator 51 by line 50 where it is concentrated. The concentrated liquor is then transferred to centrifuge 53 by line 52 and the overflow from centrifuge 53 is recycled by line 54 to evaporator 51. Solids issuring from centrifuge 53 are transferred by line 55 to drier 56 and the dried solids are transferred to furnace 58 by line 57. During the furnacing the intermediate sulfur compounds, such as, potassium thiosulfate, potassium sulfite, etc., are converted to potassium sulfate and the solids product issuing from furnace 58 by line 59 contains essentially potassium carbonate and potassium sulfate. These solids are placed in leaching tank 60 to which water 62 is added by line 63. Water is added to leaching tank 60 in an amount which is sufficient to dissolve all the potassium carbonate present but insufficient to dissolve all of the potassium sulfate present. The resulting slurry, therefore, comprises a saturated solution of potassium sulfate containing dissolved potassium carbonate and solid phase potassium sulfate. This slurry is recycled by line 23 to leaching tank 20 where it is utilized to dissolve potassium sulfide from reduced solids. In a continuous process the leaching solution will contain between about 10% and about 20% potassium carbonate by weight, usually about 15% by weight.

Separation of potassium sulfate 31 and potassium bicarbonate by line 46 from the process prior to furnacing of intermediate sulfur compounds in furnace 58, provides for substantial economy in operation in that the quantity of material passed through furnace 58 is maintained at a minimum. The quantity of material passed through furnace 58 constitutes only about 25% of the quantity of material which would need to be furnaced if potassium sulfate and potassium bicarbonate were not separated at prior stations, that is, at filter 29 and centrifuge 45 respectively.

The recycling of a saturated potassium sulfate solution, containing solid phase potassium sulfate and utilizing such a slurry in leaching tank 20 in place of fresh water to dissolve potassium sulfide from the reduced solids, permits operation of this invention with a minimum amount of fresh water. Also, by preparing the saturated potassium sulfate solution as shown in the flow sheet, that is, by treating the solids issuing from furnace 58 with water the resulting solution will contain dissolved potassium carbonate. The presence of potassium carbonate in the leach solution has a very beneficial effect in that the solubility of potassium sulfate is reduced thereby and less potassium sulfate is carried forward in the process beyond the initial leaching step.

The carbonaceous materials utilized in this invention are carbon-containing materials which are substantially non-volatile at temperatures of less than about 700° C., but which provide free carbon at temperatures attained during furnacing, that is, at temperatures above about 725° C. Materials which may be utilized include carbon black, asphalt and other petroleum distillation residues, for example, Bunker C oil. In addition, carbon-containing materials, such as sugars, wheat flour, starch, sawdust, pitch, peat, lignin, and the like may be used. Also included within the term "carbonaceous material" are coal, graphite, carbon, bone black, lamp black, coal tar pitch, and similar materials. Carbonaceous materials containing little or no ash-forming impurities are preferred and petroleum coke is particularly preferred because it is substantially entirely free of ash-forming impurities and has good handling properties. The carbonaceous material is employed in an amount of at least about 3%, and preferably between about 8% and about 17% based on the weight of langbeinite utilized. Larger quantities may be used but there is little advantage in doing so since the added expense is not compensated by proportionately increased reaction rates or yields.

The following example illustrates a specific embodiment of this invention. All parts and percentages are by weight unless otherwise indicated.

*Example I*

Langbeinite containing about 0.5% sodium chloride was mixed in an amount of about 392 parts with about 39.2 parts magnesium oxide and about 58.8 parts of uncalcined petroleum coke. These reactants were ground to a size which passed through an 80 mesh screen and then, after the addition of about 49 parts water to act as a binder, formed into pellets of about 0.3 inch in diameter at a pressure of about 10,000 p.s.i.

The pelletized or granulated feed was passed through a direct-fired reducing furnace in which natural gas was burned with only about 60% of the volume of air required for complete combustion. In this gas atmosphere the product was heated at about 850° C. for not less than one hour, during which period the magnesium sulfate was converted to magnesium oxide and most of the potassium sulfate was reduced to potassium sulfide.

The exit gases from the furnace contained 60.4 parts sulfur values either as sulfur vapor or hydrogen sulfide plus other combustion products. These sulfur values were recovered by passing the gases through a conventional Claus furnace.

The solid reduced product from the furnace was cooled to about 50° C. in an atmosphere of dry natural gas to avoid reoxidation of the potassium sulfide formed during the reaction. The natural gas which was thus heated by contact with the hot reaction product solid was introduced into the furnace and burned as fuel.

The cooled reduction product consisted of about 88.6 parts potassium sulfide, about 115.2 parts magnesium oxide, about one part unreacted carbon and about 24.7 parts residual potassium sulfate, including a small amount of other potassium, sulfur, and oxygen compounds, so called intermediate sulfur compounds, such as potassium sulfite, potassium thiosulfate, etc. This product was leached at room temperature with a slurry containing solid phase potassium sulfate the liquid phase being saturated with potassium sulfate and containing about 14% of dissolved potassium carbonate. The leaching solution consisted of about 200 parts water, about 35.6 parts potassium carbonate, about 8.3 parts potassium sulfate and about 5.0 parts suspended potassium sulfate crystals. Under these leaching conditions the potassium sulfide and intermediate sulfur compounds present in the reduced langbeinite solids were dissolved and the potassium sulfate and magnesium oxide components of the reduced langbeinite solids remained undissolved. The slurry was filtered to separate the magnesium oxide and potassium sulfate from the solution phase. After a displacement water wash on the filter, the filter cake was leached with water at about 90° C. to dissolve the potassium sulfate and separate it from the insoluble magnesium oxide. The filtrate from this leaching step was then processed by conventional procedures to recover the potassium sulfate therefrom. The solid residue remaining, following the removal of potassium sulfate, contained almost all of the original magnesium values as magnesium oxide. A portion of this magnesium oxide was recycled to the initial step in the process to be admixed with fresh langbeinite and carbonaceous material. The remainder of the magnesium oxide was calcined at about 2500° F. to yield about 72 parts of magnesium oxide which was suitable for refractory or chemical purposes.

The filtrate from the primary leaching, that is, the leaching of the reduced langbeinite with saturated potassium sulfate solution containing solid phase potassium sulfate, consisted of about 88.6 parts potassium sulfide, about 35.6 parts potassium carbonate, about 8.3 parts potassium sulfate, about 5.45 parts potassium thiosulfate and other intermediate sulfur compounds and about 200 parts water. This solution was treated with boiler flue gas (12% $CO_2$) at room temperature until the solution had attained a pH value of about 7.9. At this point, substantially all of the sulfide had been converted to carbonate or bicarbonate, the sulfide being volatilized as hydrogen sulfide gas. The product stream from the carbonation step is a slurry which consists of about 170.9 parts dissolved potassium bicarbonate, about 8.3 parts dissolved potassium sulfate, about 5.45 parts dissolved potassium thiosulfate, etc., and about 161.5 parts crystalline potassium bicarbonate. This slurry was centrifuged to separate the solid potassium bicarbonate from the solution phase. The crystals were washed with water to remove any entrained mother liquor and the washings were added to the centrifuge effluent and fed to the evaporator. The solution was evaporated to temperatures to give a residue consisting of about 35.6 parts of potassium carbonate, about 8.3 parts potassium sulfate and about 5.45 parts potassium thiosulfate and intermediate sulfur compounds. The residue was calcined in an oxidizing atmosphere at about 600° C. to 700° C. for the purpose of converting all intermediate sulfur compounds to potassium sulfate.

The calcined product consisting of 35.6 parts potassium carbonate and 13.3 parts potassium sulfate was agitated with about 200 parts water. Only about 8.3 parts potassium sulfate were solubilized but all of the potassium carbonate component was dissolved. The remaining 5 parts of potassium sulfate were insoluble. This slurry was suitable for treating a reduced langbeinite in the initial leaching step of the process whereby potassium sulfide is dissolved and separated from potassium sulfate and magnesium oxide in the reduced product. The 5 parts of solid phase potassium sulfate in the slurry, plus any unreduced potassium sulfate in the furnaced product, remain as insoluble salts in the filter cake from the primary leaching circuit. This potassium sulfate, comprising about 25 parts was recovered from the insoluble magnesium oxide by a secondary leaching step using water at 100° C. as previously indicated.

The washed crystals remaining following centrifuging of the carbonation slurry consisted of about 161.5 parts potassium bicarbonate, which was calcined at 300° C. to give about 100 parts of anhydrous potassium carbonate product that was substantially free of chloride contamination.

Having thus fully described and illustrated the character of the instant invention, what is desired to be secured by Letters Patent is:

1. In a process for separating a mixture of magnesium oxide, potassium sulfate, and potassium sulfide, the steps which comprise leaching said mixture with an aqueous solution of potassium carbonate saturated with potassium sulfate, said potassium carbonate being in sufficient amount to inhibit solution of solid phase potassium sulfate whereby potassium sulfide is selectively dissolved from said mixture, separating the leach liquor from the undissolved solids, treating said leach liquor with carbon dioxide to a pH between about 7.9 and about 8.5, whereby the potassium sulfide therein is converted into potassium carbonate and bicarbonate and potassium bicarbonate is precipitated therefrom, separating the precipitated potassium bicarbonate, preparing from the potassium bicarbonate mother liquor an aqueous solution of potassium carbonate saturated with potassium sulfate by concentrating the solution to precipitate solid phase potassium sulfate, and recycling said aqueous solution for leaching a further quantity of said mixture of magnesium oxide, potassium sulfate, and potassium sulfide.

2. A process as in claim 1 wherein said aqueous solution saturated with potassium sulfate contains between about 10 and about 20% by weight of potassium carbonate.

3. A process as in claim 1 wherein said aqueous solution of potassium carbonate saturated with potassium sulfate is used in a proportion at least as great as the weight of said mixture of magnesium oxide, potassium sulfate, and potassium sulfide.

4. A process as in claim 1 wherein said leaching is carried out at a temperature between about 25 and about 40° C.

5. A process as in claim 1 which comprises concentrating said potassium bicarbonate mother liquor and recovering solids therefrom, commingling the solids with water in a proportion sufficient to dissolve all of the potassium carbonate therein but insufficient to dissolve all of the potassium sulfate, whereby an aqueous slurry is obtained containing solid-phase potassium sulfate in an aqueous solution of potassium carbonate saturated with potassium sulfate, and recycling said aqueous slurry for leaching a further quantity of said mixture of magnesium oxide, potassium sulfate, and potassium sulfide.

6. A process for producing potassium carbonate which comprises admixing a double sulfate salt of potassium and magnesium containing less than about 2% sodium chloride by weight with carbonaceous material and a substance selected from the group consisting of magnesium oxide and potassium carbonate, comminuting the mixture and forming the mixture into pellets, heating the pellets at a temperature between about 725 and about 1000° C. until said double salt is substantially completely converted into a mixture of magnesium oxide, potassium sulfate, and potassium sulfide, cooling the reaction product in a non-oxidizing atmosphere, leaching the reaction product with an aqueous solution of potassium carbonate saturated with potassium sulfate, said potassium carbonate being in sufficient amount to inhibit solution of solid phase potassium sulfate whereby potassium sulfide is selectively dissolved therefrom, separating the leach liquor from the undissolved solids, treating said leach liquor with carbon dioxide to a pH between about 7.9 and about 8.5, whereby the potassium sulfide therein is converted into potassium carbonate and bicarbonate and potassium bicarbonate is precipitated therefrom, separating the precipitated potassium bicarbonate, concentrating the potassium bicarbonate mother liquor and recovering solids therefrom, calcining said solids in an oxidizing atmosphere to convert any intermediate sulfur compounds of potassium therein to potassium sulfate, commingling the calcined solids with water in a proportion sufficient to dissolve all of the potassium carbonate therein but insufficient to dissolve all of the potassium sulfate, whereby an aqueous slurry is obtained comprising solid-phase potassium sulfate in an aqueous solution of potassium carbonate saturated with potassium sulfate, and recycling said aqueous slurry for leaching a further quantity of said reaction product obtained from said double sulfate salt of potassium and magnesium.

7. A process as in claim 6 in which said double sulfate salt of potassium and magnesium is langbeinite.

References Cited in the file of this patent

UNITED STATES PATENTS

| | | |
|---|---|---|
| 1,975,798 | Partridge | Oct. 9, 1934 |
| 1,983,789 | Bradley et al. | Dec. 11, 1934 |

FOREIGN PATENTS

| | | |
|---|---|---|
| 1,361 | Great Britain | June 3, 1859 |
| 819 of 1869 | Great Britain | Mar. 17, 1869 |

OTHER REFERENCES

"Mellors Modern Inorganic Chemistry," Longmans, Green and Co., New York, 1939, pp. 150–52.

Eastman et al.: "Physical Chemistry," McGraw-Hill Book Co., Inc., 1947, pp. 359–361.

Mellor: "Comprehensive Treatise on Inorganic and Theoretical Chemistry," vol. 10, page 181, Longmans, Green and Co., N.Y., 1930.

Fragen et al.: "Extraction of Potash from Polyhalite," Industrial and Engineering Chemistry, vol. 25, No. 10, pp. 1153–60, October 1933.